United States Patent

Kurasako

[11] Patent Number: 5,851,086
[45] Date of Patent: Dec. 22, 1998

[54] ROAD SURFACE CONDITION CHANGING APPARATUS PROVIDED ON A VEHICLE

[75] Inventor: Ryoichi Kurasako, Gotenba, Japan

[73] Assignee: Toyota Jidosha Kabushiki Kaisha, Toyota, Japan

[21] Appl. No.: 751,675

[22] Filed: Nov. 18, 1996

[30] Foreign Application Priority Data

Dec. 25, 1995 [JP] Japan .................................. 7-337457

[51] Int. Cl.⁶ .................................................. E01H 4/00
[52] U.S. Cl. .......................... 404/94; 404/124; 404/126; 404/128
[58] Field of Search .................... 404/84.05, 85, 404/94, 122, 124, 125, 126, 117, 128

[56] References Cited

U.S. PATENT DOCUMENTS

| | | | |
|---|---|---|---|
| 1,070,198 | 8/1913 | Stevens et al. | 404/128 X |
| 2,386,025 | 10/1945 | Wills | 404/128 X |
| 3,217,620 | 11/1965 | Mindrum et al. | 404/128 X |
| 3,233,530 | 2/1966 | Brebner | 404/124 |
| 3,625,120 | 12/1971 | Nagy . | |
| 3,823,983 | 7/1974 | Peterson | 404/124 X |
| 3,827,819 | 8/1974 | Dermond | 404/126 |
| 3,989,404 | 11/1976 | Burton | 404/128 |
| 4,193,710 | 3/1980 | Pietrowski | 404/128 |
| 4,356,584 | 11/1982 | Zamboni | 15/98 |
| 5,114,269 | 5/1992 | Shepherd | 404/128 X |
| 5,681,129 | 10/1997 | Nicodemo et al. | 404/72 |

FOREIGN PATENT DOCUMENTS

| | | |
|---|---|---|
| A-3-90460 | 4/1991 | Japan . |
| A-4-38204 | 2/1992 | Japan . |
| A-6-65130 | 9/1994 | Japan . |
| A-6-286585 | 10/1994 | Japan . |
| U-3006276 | 11/1994 | Japan . |

Primary Examiner—James Lisehora
Attorney, Agent, or Firm—Oliff & Berridge, PLC

[57] ABSTRACT

A road surface condition changing apparatus which increases a coefficient of friction between a wheel of a vehicle and a road surface without using any consumable materials. A cylinder member is provided in front of the wheel of the vehicle. The cylinder member is rotatable about a rotational axis corresponding to a longitudinal center of the cylinder member. The cylinder member is pressed against a road surface so as to change a road surface condition while being rotated. A support mechanism supports the cylinder member so that the rotational axis of the cylinder member is parallel to the road surface and is inclined with respect to the rotational axis of the wheel. Protrusions, brushes or a water absorbing material may be provided on an outer surface of the cylinder member.

10 Claims, 7 Drawing Sheets

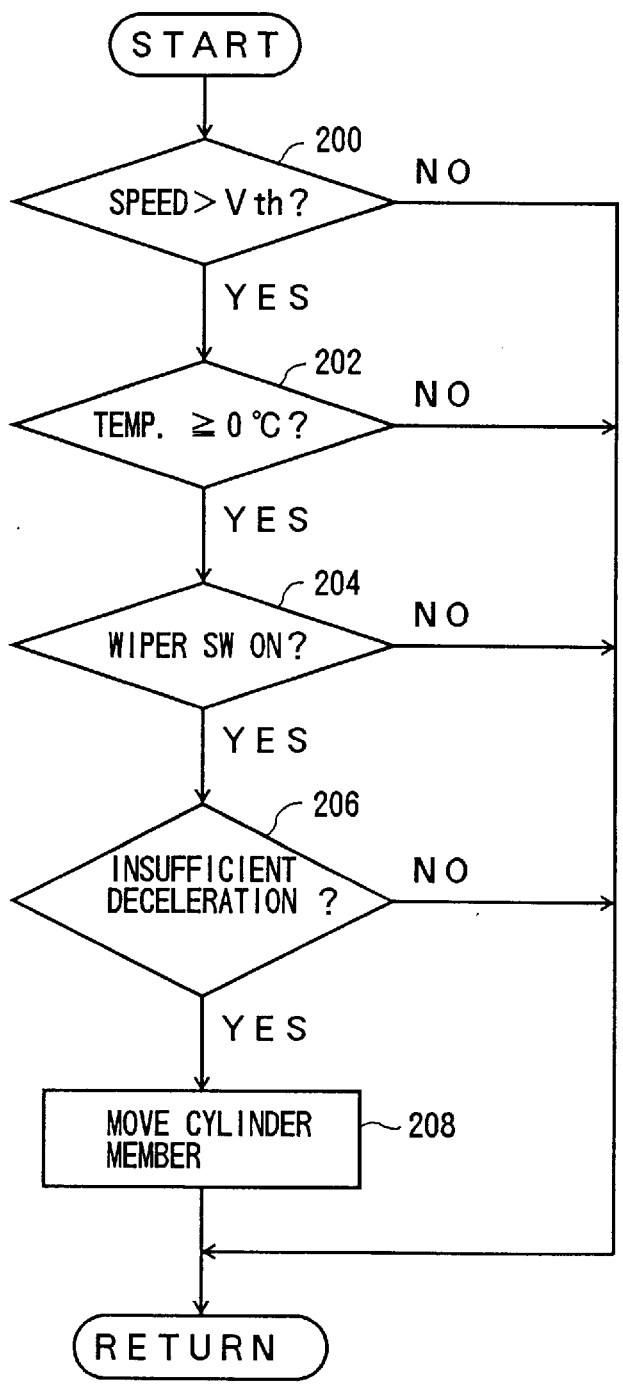

ROAD SURFACE CONDITION CHANGING APPARATUS PROVIDED ON A VEHICLE

BACKGROUND OF THE INVENTION

1. Field of the Invention

The present invention relates to a road surface condition changing apparatus and, more particularly, to a road surface changing apparatus provided on a vehicle for changing a road surface condition so that frictional force is increased between a wheel of the vehicle and a road surface having a low coefficient of friction such as a frozen or icy road surface.

2. Description of the Related Art

When a vehicle is moving on a road having a low coefficient of friction such as a frozen or icy road, the wheels of the vehicle easily slip especially during a braking operation or a starting operation. In order to solve such a problem, Japanese Laid-Open Patent Application No.4-38204 suggested an apparatus which scatters anti-skid materials such as sand in front of a vehicle during a braking or starting time. The anti-skid materials increase a coefficient of friction between the wheels and the road surface, resulting in generation of a relatively large brake force or drive force on a road having a low coefficient of friction.

In the conventional apparatus disclosed in the above patent document, the anti-skid materials stored in a vehicle are consumed as they are scattered onto a road. Thus, in order to continuously provide such an anti-skid function, consumption of the anti-skid material must be monitored to perform an appropriated maintenance such as to replenish the anti-skid materials. In this respect, the above-mentioned conventional apparatus has problems in practical use in that a large cost is expended on the anti-skid materials, and checking points of operation of a vehicle are increased.

SUMMARY OF THE INVENTION

It is a general object of the present invention to provide a novel and useful road surface condition changing apparatus in which the above mentioned problems are eliminated.

A more specific object of the present invention is to provide a road surface condition changing apparatus suitable for a vehicle moving on a road, wherein the apparatus increases a coefficient of friction between a wheel and the road surface without using any consumable materials.

Another object of the present invention is to provide a road surface condition changing apparatus which is operated only when it is determined that the road surface condition needs to be changed.

In order to achieve the above-mentioned objects, there is provided according to the present invention a road surface condition changing apparatus for a vehicle, comprising:

a cylinder member provided in front of a wheel of the vehicle, the cylinder member being rotatable about a rotational axis corresponding to a longitudinal center of the cylinder member, the cylinder member being pressed against a road surface so as to change a road surface condition while being rotated; and a support mechanism for supporting the cylinder member so that the rotational axis of the cylinder member is parallel to the road surface and is inclined with respect to the rotational axis of the wheel.

In the present invention, the cylinder member is rotatable supported by the support mechanism in front of the wheel of the vehicle. When the cylinder member is pressed against the road surface while the vehicle is moving, the cylinder member is rotated about the rotational axis. Since the rotational axis of the cylinder member is inclined with respect to the rotational axis of the wheel, the cylinder member is rotated while it slides on the road surface. That is, the rotational direction of the cylinder member includes a component perpendicular to the rotational direction of the wheel. This provides an increase in the coefficient of friction between the wheel and the road surface in either of the moving directions of the wheel and a direction perpendicular to the moving direction of the wheel. Since the road surface condition changing apparatus according to the present invention uses no consumable material to change the road surface condition, no replenishing operation is needed.

In the road surface condition changing apparatus according to the present invention, the support mechanism may comprise a moving mechanism for moving the cylinder member between a first position and a second position above the first position with respect to a body of the vehicle, the cylinder member contacting the road surface at the first position, the cylinder member being spaced away from the road surface at the second position.

According to this invention, the cylinder member can be moved to the first position only when the road surface condition needs to be changed. That is, the cylinder member can be moved to the second position where the cylinder member does not contact the road surface when it is not needed. This extends the service life of the cylinder member.

Additionally, the moving mechanism may comprise a pressing mechanism for pressing the cylinder member against the road surface with a predetermined pressing force. This provides a positive contact of the cylinder member against the road surface. The pressing force may be provided by a hydraulic actuator.

Further, in the road surface condition changing apparatus according to the present invention, the support mechanism may include a wobbling mechanism for permitting a wobbling action of the cylinder member. The wobbling action of the cylinder member may permit the cylinder member to be inclined with respect to the vehicle body. Thus, the cylinder member can contact the road surface over the entire length of the cylinder member even when the road surface is slanted. The wobbling mechanism may comprise a bushing having an elastic member, the bushing used for connecting parts of the support mechanism.

In the road surface condition changing apparatus according to the present invention, the moving mechanism may include:

determining means for determining whether a gripping force of the wheel is less than a predetermined gripping force; and control means for controlling a position of the cylinder member so that the cylinder member is moved to the first position when it is determined that the gripping force of the wheel is less than the predetermined gripping force.

In this invention, the cylinder member is moved to the first position, where the cylinder member contacts the road surface, when the gripping force of the wheel is less than the predetermined gripping force. That is, if the gripping force of the wheel is less than the predetermined gripping force, it is determined that the wheel is slipping due to a decreased coefficient of friction. In this case, the cylinder member is moved to the first position so that the cylinder member contacts the road surface to increase the coefficient of friction.

The road surface condition changing apparatus may further comprise an acceleration sensor which detects a rate of change in the moving speed of the vehicle and a wheel speed sensor detecting a rotational speed of the wheel. A determination by the determining means is based on a difference between the rate of change in the moving speed of the vehicle and a rate of change in the rotational speed of the wheel. If the difference is large, it is determined that the wheel is slipping during accelerating or decelerating operation of the vehicle. If so, the cylinder member is moved to the first position.

The road surface condition changing apparatus according to the present invention may further comprising a temperature sensor sensing an atmospheric temperature outside the vehicle. A determination by the determining means is further based on a temperature sensed by the temperature sensor. If the atmospheric temperature is below 0° C., it is determined that the road surface is in a frozen or icy condition. In this case, the cylinder member is permitted to contact the road surface since there is a possibility that the road surface is frozen or icy.

Additionally, in the road surface condition changing apparatus according to the present invention, the cylinder member may include protrusions projecting from an outer surface thereof. The protrusions form scratches or grooves on the road surface so as to increase the coefficient of friction between the wheel and the road surface.

Alternatively, the cylinder member may include brushes extending from an outer surface thereof. The brushes sweep water collected on the road surface when the vehicle is moving in a rainy condition. This prevents occurrence of a hydroplaning phenomenon.

Further, the cylinder member may include a water absorbing material wound on an outer surface thereof. The water absorbing material absorbs water on the road surface. The water is separated from the water absorbing material due to a centrifugal force generated by the rotation of the cylinder member.

Additionally, the cylinder member is made of an elastic material which deforms to follow a shape of the road surface when the cylinder member is pressed against the road surface.

Other objects, features and advantages of the present invention will become more apparent from the following detailed descriptions when read in conjunction with the accompanying drawings.

BRIEF DESCRIPTION OF THE DRAWINGS

FIG. 11 is a flowchart of a control routine performed in a road surface condition changing apparatus according to a fourth embodiment of the present invention.

DETAILED DESCRIPTION OF THE PREFERRED EMBODIMENTS

Figure 1:
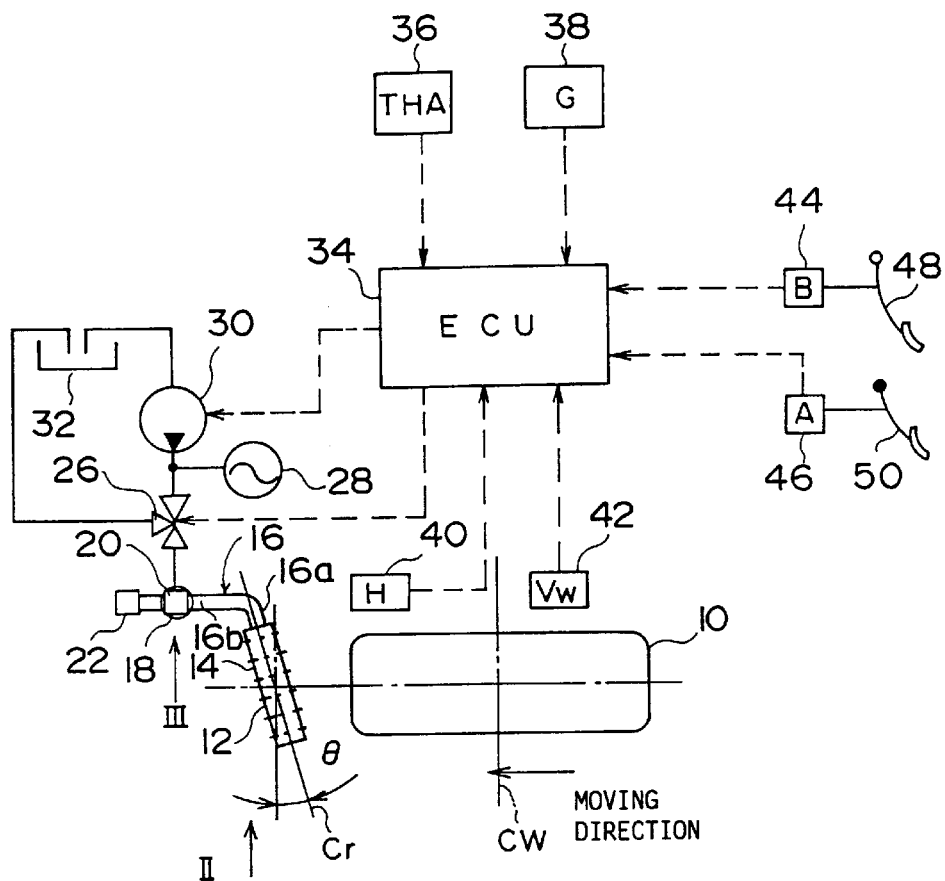
FIG. 1 is an illustration of an entire system of a road surface condition changing apparatus according to a first embodiment of the present invention.
Figure 2:
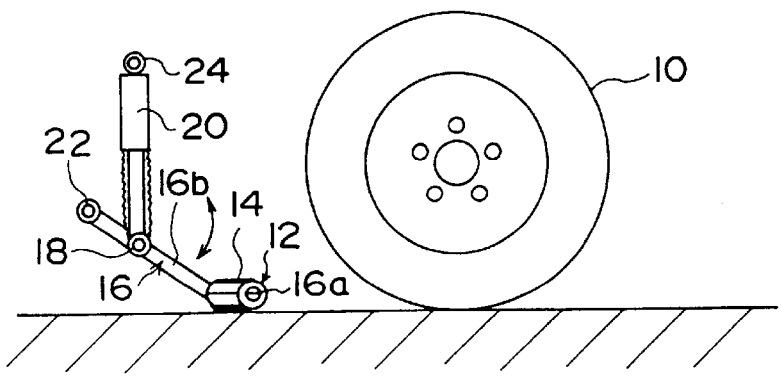
FIG. 2 is a side view of a wheel of a vehicle and a part of the road surface condition changing apparatus positioned in front of the wheel, viewed from a direction of an arrow II of FIG. 1.

A description will now be given of a first embodiment of the present invention. FIG. 1 is an illustration of an entire system of a road surface condition changing apparatus according to the first embodiment of the present invention. FIG. 2 is a side view of a wheel of a vehicle and a part of the road surface condition changing apparatus positioned in front of the wheel, viewed from a direction of an arrow II of FIG. 1.

The road surface condition changing apparatus according to the first embodiment shown in FIG. 1 is provided on a front-wheel front-drive (FF) vehicle. The road surface condition changing apparatus comprises a cylinder member or roller 12 provided in front of a front wheel 10, which is a drive wheel, of the vehicle. The cylinder member 12 has a plurality of protrusions 14 arranged on and projecting from an outer surface thereof. The cylinder member 12 is rotatable supported by a support arm 16. The support arm 16 has an insertion portion 16a inserted into the cylinder member 12 and a connection portion 16b connected to a vehicle body.

Figure 3:
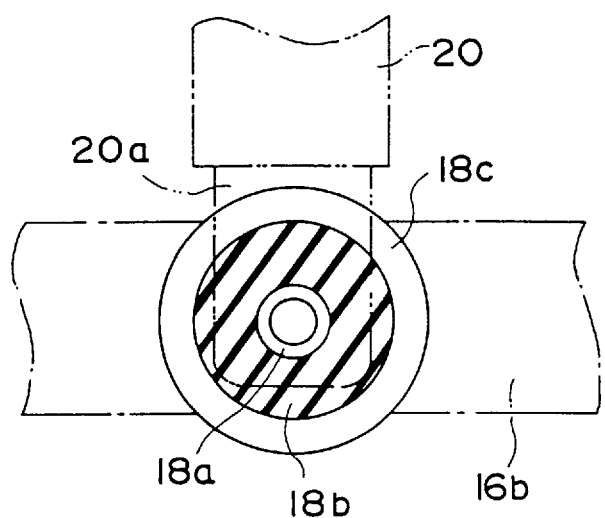
FIG. 3 is a side view of a bushing shown in FIG. 1 viewed from a direction indicated by an arrow III of FIG. 1.

The connection portion 16b is connected to a hydraulic actuator 20 via a bushing 18. FIG. 3 is a side view of the bushing 18 viewed from a direction indicated by an arrow III of FIG. 1. As shown in FIG. 3, the bushing 18 comprises an inner cylinder 18a, an outer cylinder 18c and an elastic member 18b interposed between the inner cylinder 18a and the outer cylinder 18c. The inner cylinder 18a and the outer cylinder 18c are made of metal. Thus, each of the inner cylinder 18a and the outer cylinder 18c has a high rigidity. On the other hand, the elastic member 18b is made of an elastic material such as rubber, so that the elastic member 18 has a predetermined elasticity. The outer cylinder 18c is welded to the connection portion 16b of the support arm 16. The insertion portion 16a of the support arm 16 is inserted through the inner cylinder 18a of the bushing 18.

As indicated by double dotted chain lines in FIG. 3, the hydraulic actuator 20 has on a bottom part thereof an inner cylinder support portion 20a which is connected to the inner cylinder 18a of the bushing 18. The inner cylinder support portion 20a rotatably supports the inner cylinder 18a. Thus, the support arm 16 is rotatable relative to the hydraulic actuator 20 with the inner cylinder 18a of the bushing 18 being a rotational axis.

As shown in FIG. 2, bushings 22 and 24 are provided on the end of the connection portion 16b of the support arm and the end of the hydraulic actuator 20, respectively. The bushings 22 and 24 have the same structure as the bushing 18 mentioned above. The bushings 22 and 24 are rotatably supported by respective inner cylinder support parts provided in predetermined positions of the vehicle body (not shown in the figure). Accordingly, the support arm 16 and the hydraulic actuator 20 are rotatable with respect to the vehicle body about inner cylinders of the respective bushings 22 and 24.

According to the structure in which the support arm 16 is connected to the hydraulic actuator 20 and the vehicle body via the bushings 18 and 22, the support arm 16 is capable of wobbling within a range allowable by the elasticity of the elastic members 18b and 22b of the bushings 18 and 22.

The hydraulic actuator 20 is connected, as shown in FIG. 1, with a switching valve 26. The switching valve 26 is connected to a high pressure source which comprises an accumulator 28 and a pump 30. The switching valve 26 is also connected to the a low pressure source which comprises a reservoir tank 32. The switching valve 26 switches connection of the hydraulic actuator 20 to either one of the high pressure source and the low pressure source in response to an externally input instruction signal. When the high pressure source is connected to the hydraulic actuator 20, pressure in the hydraulic actuator 20 is increased. On the other hand, when the low pressure source is connected to the hydraulic actuator 20, pressure in the hydraulic actuator 20 is decreased.

More specifically, when the high pressure source is connected to the hydraulic actuator 20, a high hydraulic pressure is provided to the hydraulic actuator 20. This results in the hydraulic actuator 20 being extended. As a result, a downward pressing force is transmitted to the support arm 16 via the bushing 18 in a direction toward the road surface. When the such a pressing force is exerted on the support arm 16, the support arm 16 rotates clockwise in FIG. 2 about the inner cylinder of the bushing 22. Thus, the cylinder member 12 contacts the road surface. Thereafter, the cylinder member 12 is pressed against the road surface in response to the pressing force generated by the hydraulic actuator 20. As mentioned above, in the present embodiment, the cylinder member 12 can be pressed against the road surface by increasing the hydraulic pressure in the hydraulic actuator 20 by switching the switching valve 26 so that the hydraulic actuator 20 is connected to the high pressure source.

In the present embodiment, when the cylinder member 12 contacts the road surface, the rotational axis Cr of the support arm 16 is parallel to the road surface. Additionally, the rotational axis Cr is inclined by a predetermined angle Θ with respect to the rotational axis CW of the wheel 10. Accordingly, if the cylinder member 12 is pressed against the road surface, the cylinder member 12 contacts the road surface over the entire length thereof. Additionally, since the cylinder member 12 is allowed to wobble together with the support arm 16 as mentioned above, the cylinder member 12 can contact the road surface substantially evenly over the entire length even if the road surface is slanted.

When the hydraulic actuator 20 is connected to the low power source by the switching valve 26, the hydraulic pressure in the hydraulic actuator 20 is released to the reservoir tank 32. Thus, the hydraulic actuator 20 is shortened, and the support arm 16 rotates counterclockwise in FIG. 2 about the bushing 22. As a result, the cylinder member 12 separates from the road surface. As mentioned above, in the present embodiment, the cylinder member 12 can be separated away from the road surface by decreasing the hydraulic pressure in the hydraulic actuator 20 by switching the switching valve 26 so that the hydraulic actuator 20 is connected to the low pressure source.

As shown in FIG. 1, the road surface condition changing apparatus according to the present embodiment comprises an electronic control unit (ECU) 34. The ECU 34 controls the switching valve 26 and the pump 30. The ECU 34 is connected with an atmospheric temperature sensor 36 and an acceleration sensor 38. The ECU 34 detects an atmospheric temperature based on the output of the atmospheric temperature sensor 36. Additionally, the ECU 34 detects an acceleration G generated in the vehicle in the longitudinal direction of the vehicle based on the output of the acceleration sensor 38. The output of the acceleration sensor 38 takes a positive value when the vehicle accelerates forwardly, and takes a negative value when the vehicle decelerates.

The ECU 34 is also connected with a vehicle height sensor 40 and a wheel velocity sensor 42. The vehicle height sensor 40 outputs a signal corresponding to a relative position of the vehicle body with respect to the wheel. The ECU 34 calculates a vehicle height H based on the signal output from the vehicle height sensor 40. The wheel sensor 42 outputs pulse signals at a frequency corresponding to the rotational velocity of the wheel 10. The ECU 34 calculates a rotational velocity Vw of the wheel 10 based on the frequency of the pulse signal.

Additionally, a brake switch 44 and an acceleration sensor 46 are connected to the ECU 34. The brake switch 44 outputs an on-signal when the brake pedal 48 is depressed. The ECU 34 determines whether or not the vehicle is in a braking operation based on a condition of the brake switch 44. The acceleration sensor 46 outputs a signal corresponding to the depressed amount of an acceleration pedal 50 The ECU 34 determines whether or not the vehicle is in an accelerating condition based on the output signal of the acceleration sensor 46.

Figure 4:
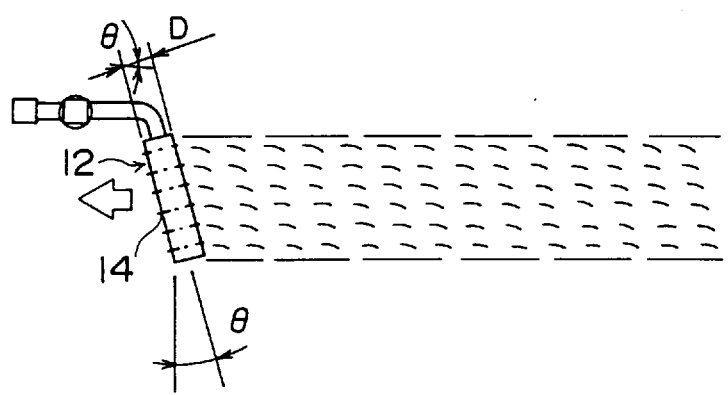
FIG. 4 is a plan view of a frozen or icy road surface a surface condition of which has been changed by the road surface condition changing apparatus shown in FIG. 1.

A description will now be given, with reference to FIGS. 4 and 5, of an operation of the road surface condition changing apparatus according to the present embodiment. FIG. 4 is a plan view of a frozen or icy road surface which has been changed by the road surface condition changing apparatus shown in FIG. 1.

As mentioned above, the rotational axis Cr of the cylinder member 12 is inclined by a predetermined angle Θ with respect to the rotational axis of the wheel 10. Thus, when the protrusions 14 projecting from the cylinder member 12 move from the front side (the left side in FIG. 4) to the rear side (the right side in FIG. 4) of the cylinder member 12, the protrusions 14 are shifted a distance D·sinΘ (D: diameter of the cylinder member 12) in a direction of the width of the vehicle.

Accordingly, in the present embodiment, if the vehicle moves with the cylinder member 12 being pressed against a road surface, the protrusions 14 of the cylinder member 12 moves in the moving direction of the wheel 10 and at the same time moves in the direction of the width of the vehicle. As a result, as shown in FIG. 4, a plurality of scratches or grooves having an inclined component relative to the moving direction of the wheel 10 are formed on the road surface.

When the vehicle is moving on a frozen or icy road, a grip of the wheel 10 in the moving direction of the wheel 10 can be increased by forming scratches or grooves extending in the direction of width of the vehicle on the road surface. Additionally, in such a condition, a grip of the wheel 10 in the direction of the width of the vehicle can be increased by forming scratches or grooves extending in the moving direction of the wheel 10. Thus, if a number of scratches or grooves extending in a direction inclined with respect to the moving direction of the wheel 10 are formed on the road surface, a gripping force can be increased in both the front-to-rear direction and the side-to-side direction of the wheel 10. As discussed above, the road surface condition changing apparatus according to the present embodiment can improve a road surface condition to increase a grip force of the wheel 10 when the vehicle is moving on a frozen or icy road.

Figure 5:
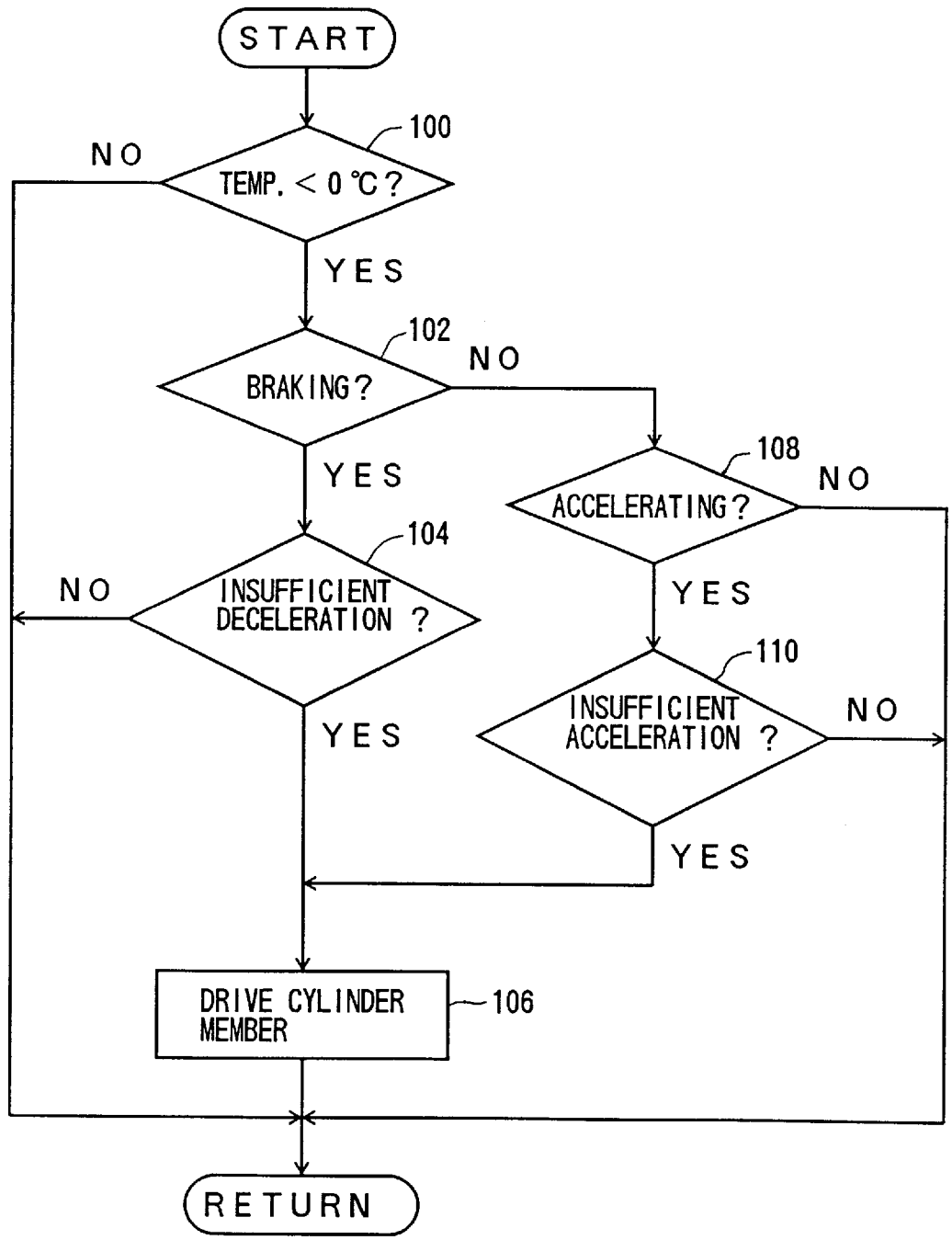
FIG. 5 is a flowchart of a control routine performed by an ECU shown in FIG. 1 so as to contact a cylinder member only when a vehicle is in an accelerating or decelerating operation.

FIG. 5 is a flowchart of a control routine performed by the ECU 34 shown in FIG. 1 so as to contact the cylinder member with the road surface only when the vehicle is in an accelerating or decelerating operation. The control routine shown in FIG. 5 is an interruption routine which is started at predetermined time periods.

When the control routine shown in FIG. 5 is started, it is determined, in step 100, whether or not the atmospheric temperature THA is lower than zero degrees Celsius (0° C.). If it is determined that the relationship THA<0° C. is not satisfied, it is determined that there is no possibility that the road surface is frozen or icy. In this case, the routine is ended without performing any process. On the other hand, if it is determined that the relationship THA<0° C. is satisfied, it is determined that there is a possibility that the road surface is frozen or icy. In this case, the routine proceeds to step 102. In the present embodiment, "0° C." is used as a threshold value to determine the possibility of freezing of the road surface. However, the threshold value is not limited to "0° C.", and is set to an arbitrary temperature depending on the condition of the atmospheric temperature sensor 36 or other factors.

In step 102, it is determined whether or not the vehicle is in a braking operation based on the condition of the brake switch 44. If it is determined that the vehicle is in a braking operation, the routine proceeds to step 104. In step 104, it is determined whether or not the deceleration |G| of the vehicle is insufficient for the deceleration |dVw/dt| generated in the rotational speed of the wheel 10.

If the wheel 10 has a gripping force in a braking operation due to an appropriate coefficient of friction, no large difference is generated between the deceleration |G| of the vehicle and the deceleration |dVw/dt| of the wheel 10. In this case, it is determined that the condition of step 104 is not established. Thus, when such a determination is made, it is determined that there is no need to change the road surface condition, and the routine is ended without any process thereafter.

On the other hand, if an appropriate gripping force cannot be maintained in a braking operation due to a low coefficient of friction, much less deceleration is generated in the vehicle while a large deceleration is generated in the rotational speed of the wheel 10. In such a case, it is determined that the condition of step 104 is established. Thus, it is determined that the road surface is frozen or icy and a change in road surface is needed. In this case, the routine proceed to step 106 so as to move the cylinder member 12 to contact the road surface, and the routine is ended.

The road surface changing apparatus is provided with the vehicle height sensor 40 as mentioned above. The ECU 34 calculates a height of the vehicle based on the signal output from the vehicle height sensor 40 so as to calculate an appropriate pressure provided to the hydraulic actuator 20 to press the cylinder member 12 against the road surface with an appropriate pressing force. In the above-mentioned step 106, the switching valve 26 is controlled so that the appropriate pressure is provided to the hydraulic actuator 20.

In the present embodiment, the switching valve 26 is controlled so as to control extension of the hydraulic actuator 20 based on the signal output from the vehicle height sensor 40. However, a pressing force sensor may be provided to detect a pressing force provided by the hydraulic actuator 20 so that the operation of the switching valve 26 is controlled based on the detected pressing force.

If the process of step 106 is performed during deceleration, a number of scratches or grooves are formed in front of the wheel 10 on the road surface as shown in FIG. 4, and an increased gripping force is provided to the wheel 10. Thus, the road surface condition changing apparatus according to the present embodiment can provide a high braking ability to the vehicle moving on a frozen or icy road.

If it is determined, in step 102, that the vehicle is not in a braking operation, the routine process to step 108. In step 108, it is determined whether or not the vehicle in an accelerating operation based on the signal of the acceleration sensor 46. If it is determined that the vehicle is in an accelerating operation, the routine proceeds to step 110. In step 110, it is determined whether or not the acceleration |G| of the vehicle is insufficient for the acceleration |dVw/dt| generated in the rotational speed of the wheel 10.

If the wheel 10 has a gripping force in a braking operation due to an appropriate coefficient of friction, no large difference is generated between the acceleration |G| of the vehicle and the acceleration |dVw/dt| of the wheel 10. In this case, it is determined that the condition of step 110 is not established. Thus, when such a determination is made, it is determined that there is no need to change the road surface condition, and the routine is ended without any process thereafter.

On the other hand, if an appropriate gripping force cannot be maintained in an accelerating operation due to a low coefficient of friction, much less acceleration is generated in the vehicle while a large acceleration is generated in the rotational speed of the wheel 10. In such a case, it is determined that the condition of step 110 is established. Thus, it is determined that the road surface is frozen or icy and the road surface change is needed. In this case, the routine proceed to step 106 so as to move the cylinder member 12 to contact the road surface, and the routine is ended.

If the process of step 106 is performed during an acceleration, a number of scratches or grooves are formed in front of the wheel 10 on the road surface as shown in FIG. 4, and thus an increased gripping force is provided to the wheel 10. Thus, the road surface condition changing apparatus according to the present embodiment can provide a high acceleration ability to the vehicle moving on a frozen or icy road.

Additionally, if it is determined, in step 108, that the vehicle is not in an accelerating operation, it is determined that the vehicle is moving at a steady speed. In this case, in order to avoid an unnecessary operation of the cylinder member 12 being pressed against the road surface, the process of step 106 is not performed. Thus, the road surface condition changing apparatus according to the present embodiment improves the road surface condition by increasing the coefficient of friction of the wheel 10 by pressing the cylinder member 12 against the road surface only when the road is frozen or icy and the vehicle is in an accelerating or decelerating operation.

In the above-mentioned embodiment, the ECU 34 is provided independently so as to control the operation of the road surface condition changing apparatus. However, the function of the ECU 34 may be performed by an electronic control unit for an anti-lock brake system (ABS). This may reduce manufacturing cost of the road surface condition changing apparatus according to the present embodiment.

Figure 6:
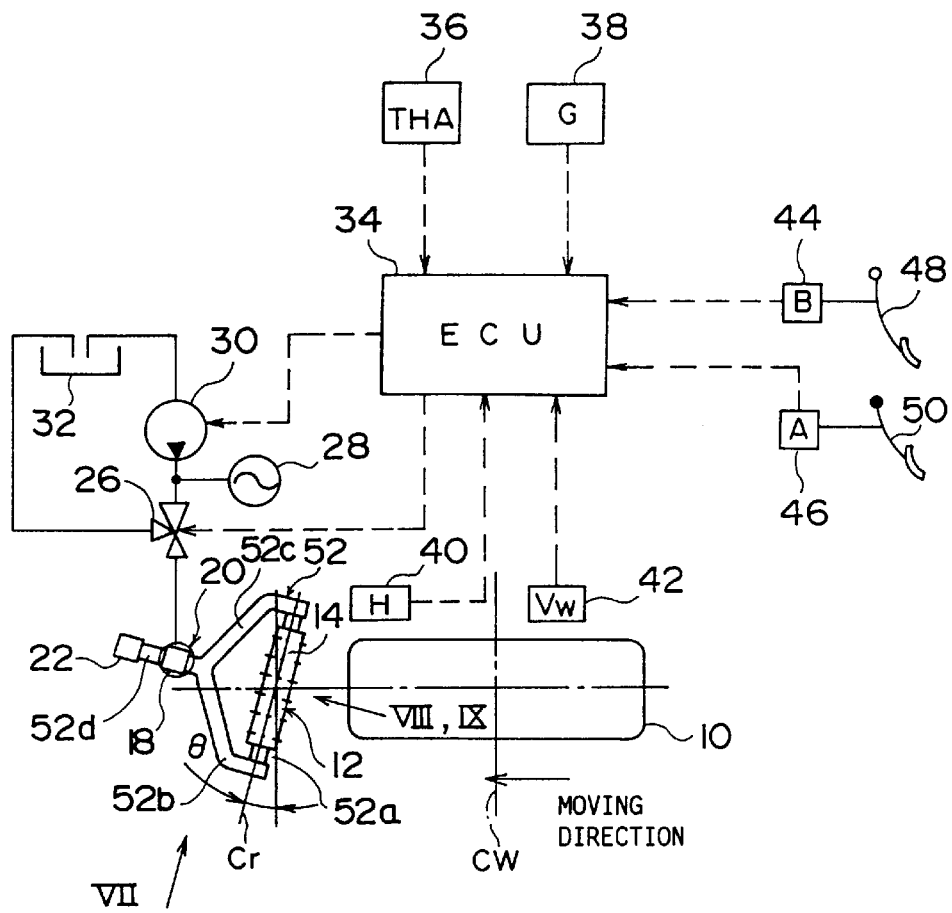
FIG. 6 is an illustration of an entire system of a road surface condition changing apparatus according to a second embodiment of the present invention.
Figure 7:
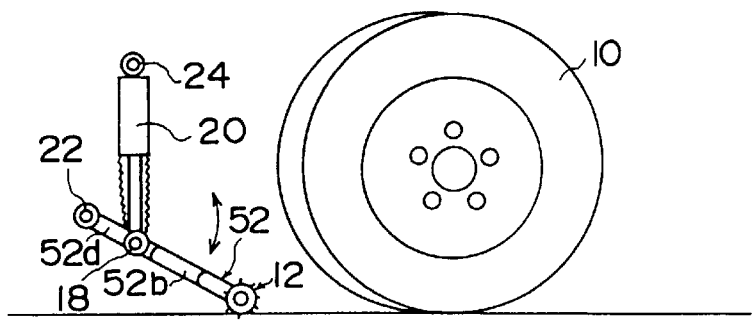
FIG. 7 is a side view of a wheel of a vehicle and a part of the road surface condition changing apparatus positioned in front of the wheel, viewed from a direction of an arrow VII of FIG. 6.

A description will now be given, with reference to FIGS. 6 and 7, of a road surface condition changing apparatus according to a second embodiment of the present invention. FIG. 6 is an illustration of an entire system of a road surface condition changing apparatus according to the second embodiment of the present invention. FIG. 7 is a side view of a wheel of a vehicle and a part of the road surface condition changing apparatus positioned in front of the wheel, viewed from a direction of an arrow VII of FIG. 1. In FIGS. 6 and 7, parts that are the same as the parts shown in FIGS. 1 and 2 are given the same reference numerals, and descriptions thereof will be omitted.

As shown in FIG. 6, the road surface condition changing apparatus according to the second embodiment of the present invention is provided with a support arm 52 instead of the support arm 16 of the first embodiment. The support arm 52 supports the cylinder member 12 from opposite ends. The support arm 52 comprises an insertion portion 52a, arm portions 52b and 52c and a connection portion 52d. The insertion portion is inserted in the cylinder member 12 as a shaft about which the cylinder member 12 is rotated. The arm portions 52b and 52c are formed symmetrically so as to hold opposite ends of the insertion portion 52a. The connection portion 52d connects the arm portions 52b and 52c to the hydraulic actuator 20 and the vehicle body.

Additionally, the support arm 52 is designed so that the rotational axis Cr of the cylinder member 12 is parallel to the vehicle body and is inclined by a predetermined angle e with respect to the rotational axis of the wheel 10 when the cylinder member 12 contacts the road surface.

According to the structure of the support arm 52, a pressing force generated by the hydraulic actuator 20 is transmitted almost equally to the arm portions 52b and 52c via the connection portion 52d. That is, the cylinder member 12 of the present embodiment is pressed against the road surface by being provided with pressing forces on opposite ends thereof. Thus, according to the road surface condition changing apparatus of the present embodiment, the entire length of the cylinder member 12 is pressed equally as compared to that of the first embodiment which has the cantilever-type support arm. This results in an equal treatment of the road surface condition over the entire width of an area where the wheel 10 moves.

Figure 8:
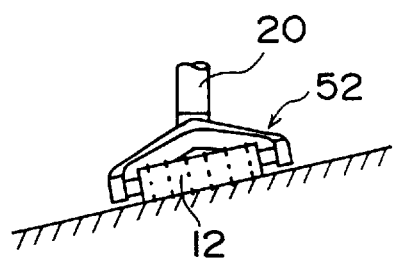
FIG. 8 is an illustration of the cylinder member and the support arm shown in FIG. 6 viewed from a direction of an arrow VIII of FIG. 6 when the cylinder member contacts a slanted road surface.

FIG. 8 is an illustration of the cylinder member 12 and the support arm 52 viewed from a direction of an arrow VIII of FIG. 6 when the cylinder member 12 contacts a slanted road surface. Similar to the support member 16 of the first embodiment, the support arm 52 is connected to the hydraulic actuator 20 via the bushing 18 and to the vehicle body via the bushing 22. Thus, the cylinder member 12 can wobble within a range allowed by an elastic deformation of the bushings 18 and 22. Thus, according to the road surface condition changing apparatus of the present embodiment, the entire length of the cylinder member 12 can be equally pressed against the road surface when the road surface is slanted.

Figure 9:
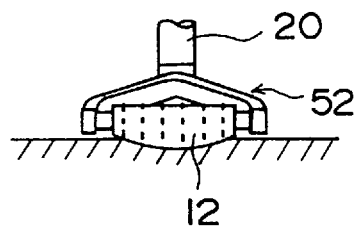
FIG. 9 is an illustration of the cylinder member and the support arm viewed from a direction of an arrow IX of FIG. 6 when the cylinder member is pressed against a wheel track formed on the road surface.

FIG. 9 is an illustration of the cylinder member 12 and the support arm 52 viewed from a direction of an arrow IX of FIG. 6 when the cylinder member 12 is pressed against a wheel track formed on the road surface. In the present embodiment, the cylinder member 12 has an elasticity almost equal to the elasticity of the wheel 10. Accordingly, if a wheel track is formed on the road surface as shown in FIG. 9, the cylinder member 12 can be deformed to follow the surface of the wheel track. Thus, the cylinder member 12 is pressed against the road surface over the entire length even when a wheel track is formed on the road surface. This results in an improvement of the road surface condition so that the wheel 10 can provide an increased gripping force when a road formed with a wheel track is in a frozen or icy condition.

Figure 10:
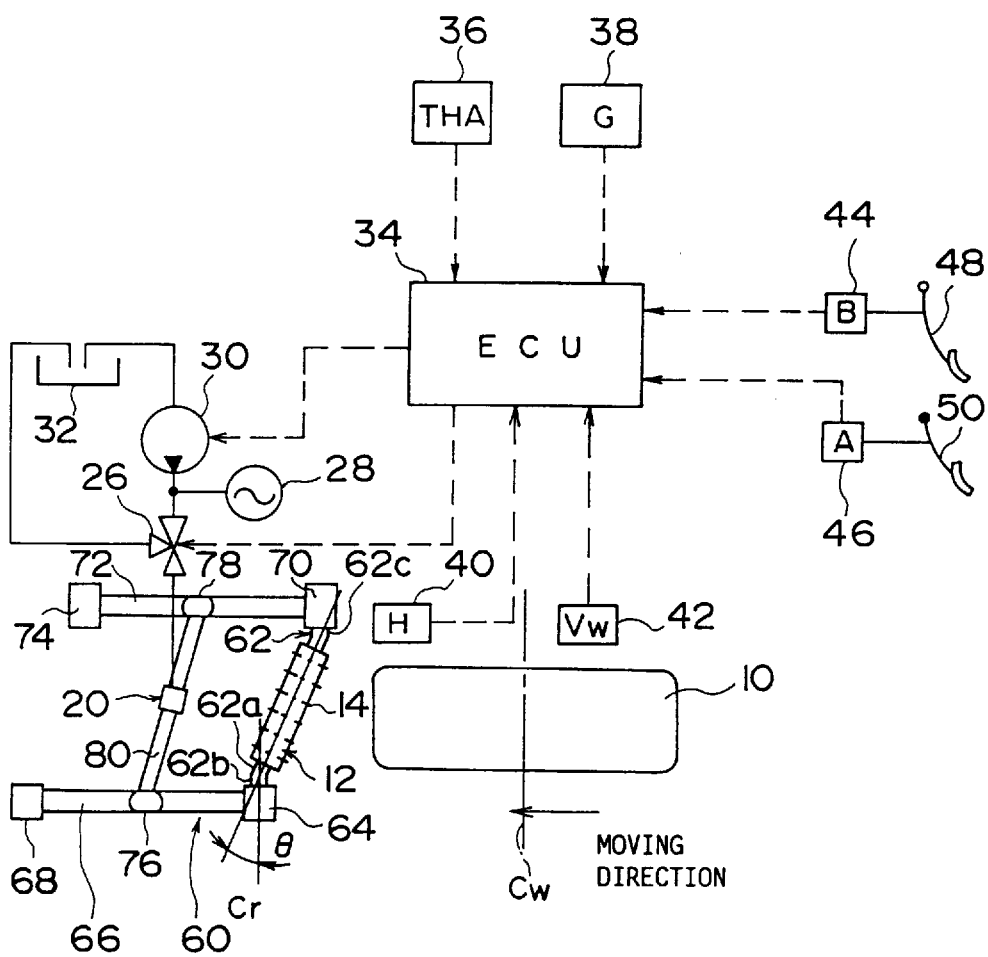
FIG. 10 is an illustration of an entire system of a road surface condition changing apparatus according to a third embodiment of the present invention.

A description will now be given, with reference to FIG. 10, of a road surface condition changing apparatus according to a third embodiment of the present invention. FIG. 10 is an illustration of an entire system of a road surface condition changing apparatus according to the third embodiment of the present invention. In FIG. 10, parts that are the same as the parts shown in FIGS. 1 and 2 are given the same reference numerals, and descriptions thereof will be omitted.

As shown in FIG. 10, the road surface condition changing apparatus according to the third embodiment of the present invention is provided with a support arm mechanism 60. The support arm mechanism 60 supports the cylinder member 12 from opposite ends. The support arm mechanism 60 comprises an insertion portion 62 which is inserted in the cylinder member 12. The insertion portion 62 comprises an inclined shaft 62a and parallel portions 62b and 62c. The incline shaft corresponds to the rotational axis of the cylinder member 12. The parallel portions 62b and 62c are connected to the respective ends of the inclined shaft 62a. The inclined shaft 62a is designed so that cylinder member 12 is positioned parallel to the vehicle body and is inclined by a predetermined angle Θ with respect to the rotational axis CW of the wheel 10. Additionally, the parallel portions 62b and 62c are positioned parallel to the rotational axis CW of the wheel 10.

The parallel portion 62b is connected to a swing arm 66 via a bushing 64 so that the parallel portion 62b can be wobbled with respect to the swing arm 66 within a range allowable by the elasticity of the bushing 64. The swing arm 66 is connected to the vehicle body via a bushing 68. The bushing 68 has the same construction with the bushing 22 shown in FIG. 1 and mounted to the vehicle body in the same manner as that of the bushing 22. Accordingly, the swing arm 66 is pivotable with respect to the vehicle body as an inner cylinder of the bushing 68 being the center axis.

Similarly, the parallel portion 62c is connected to a swing arm 72 via a bushing 70 so that the parallel portion 62c can be wobbled with respect to the swing arm 72 within a range allowable by the elasticity of the bushing 70. The swing arm 72 is connected to the vehicle body via a bushing 74. The bushing 74 has the same construction as the bushing 22 shown in FIG. 1 and is mounted to the vehicle body in the same manner as that of the bushing 22. Accordingly, the swing arm 72 is pivotable with respect to the vehicle body as an inner cylinder of the bushing 74 being the center axis.

The swing arms 66 and 72 have the same length and a beam 80 is provided there between via respective ball joints 76 and 78. The beam 80 can be wobbled with respect to the swing arms 66 and 72 within a range allowable by the ball joints 76 and 78. The hydraulic actuator 20 is connected at the center of the beam 80. The hydraulic actuator 20 is pivotable with respect to the beam 80 in the front-to-rear direction of the vehicle.

The bushing 68 connected to the swing arm 66 and the bushing 74 connected to the swing arm 72 are mounted to the vehicle body in a horizontal relationship to each other. When the hydraulic actuator 20 presses the beam 80, the parallel portions 62b and 62c of the insertion portion 62 are in a horizontal relationship with respect to each other. Thus, when the hydraulic actuator 20 reaches a predetermined extended length, the cylinder member 12 contacts in parallel to the road surface.

As mentioned above, if the road surface is not slanted in a direction of the width of the vehicle, the cylinder member 12 contacts the road surface over the entire length thereof without the bushing 64 and 70 being elastically deformed. On the other hand, if the road surface is slanted in the direction of the width of the vehicle, the cylinder member 12 can be inclined within a range allowable by the elastic deformation of the bushings 64 and 70. As a result, the cylinder member 12 contacts the road surface over the entire length even if the road surface is slanted.

Additionally, according to the support arm mechanism 60 mentioned above, the pressing force transmitted from the hydraulic actuator 20 to the beam 80 is transmitted substantially equally to opposite ends of the cylinder member 12. Similar to the second embodiment of the present invention, the road surface condition changing apparatus according to the present embodiment has superior contact with the entire length of the cylinder to the road surface.

A description will now be given, with reference to FIG. 11, of a road surface condition changing apparatus according to a fourth embodiment of the present invention. The road surface condition changing apparatus according to the present embodiment comprises a brush-like cylinder member instead of the cylinder member 12 having a plurality of protrusions 14 according to the first to third embodiment of the present invention. The ECU 34 of the present embodiment performs the control routine shown in FIG. 11. The control routine shown in FIG. 11 is a routine performed to avoid hydroplaning. This control routine is an interruption routine started each predetermined time period.

When the control routine shown in FIG. 11 is started, it is determined, in step 200, whether or not vehicle speed V exceeds a predetermined threshold value Vth. If it is determined that the vehicle speed V does not exceed the threshold value Vth, it is determined that hydroplaning will not occur since the vehicle speed is low. In this case, the routine is ended without performing any process. On the other hand, if it is determined that the vehicle speed V exceeds the threshold value Vth, it is determined that there is a possibility that hydroplaning will occur, and the routine proceeds to step 202.

In step 202, it is determined whether or not the atmospheric temperature THA is more than zero degrees Celsius (0° C.). If it is determined that the atmospheric temperature THA is not equal to or greater than 0° C., it is preferable to perform a process to avoid a slippage of wheels due to snow or ice on the road. Thus, when the condition THA≧0° is not established, the routine is ended without performing any further process. On the other hand, if it is determined that the condition THA≧0° is established, the routine proceeds to step 204.

In step 204, it is determined whether or not a wiper switch is turned on. Hydroplaning occurs when a water film is formed between a wheel and a road surface. This phenomena generally occurs when it is raining heavily. Thus, in the present routine, it is determined that there is no possibility of hydroplaning when the wiper switch is turned off. Thereafter, no process is performed and the routine is ended. On the other hand, if it is determined that the wiper switch is turned on, the routine proceeds to step 206.

In step 206, it is determined whether or not the deceleration |G| of the vehicle is insufficient for the deceleration |dVw/dt| generated in the rotational speed of the wheel 10. If the wheel 10 has an appropriate or sufficient gripping force in a braking operation, no large difference is generated between the deceleration |G| of the vehicle and the deceleration |dVw/dt| of the wheel 10. Accordingly, if the deceleration |G| of the vehicle is insufficient for the deceleration |dVw/dt| generated in the rotational speed of the wheel 10, it is determined that the wheel 10 does not have an appropriate gripping force. In the present embodiment, if the conditions of steps 200 to 204 are established and if it is determined that the wheel 10 does not have an appropriate gripping force, it is determined that hydroplaning is occurring.

Thus, when the condition of step 206 is established, the routine proceeds to step 208 to move the brush-like cylinder member 12 to contact the road surface, and the routine is ended. In step 208, the brush-like cylinder member 12 is moved toward the road surface in the same manner as that of the step 106 shown in FIG. 5 based on the output signal of the vehicle height sensor 40.

On the other hand, if it is determined, in step 206, that the vehicle is not in a decelerating operation or the deceleration of the vehicle is not insufficient for the deceleration of the wheel speed, it is determined that an appropriate gripping force is maintained for the wheel 10. Thus, it is determined that there is no need to change the road surface condition, and the routine is ended without performing the process of step 208.

If the brush-like cylinder member 12 is pressed against the road, water in an area in front of the wheel 10 is swept away by the brush-like cylinder member 12. The sweeping action of the brush-like cylinder member 12 is such that the tips of the brush trace the scratches or grooves shown in FIG. 4. That is, the brush-like cylinder member 12 sweeps the water away in a direction inclined from the moving direction of the wheel 10.

In order to sweep water away from the area in front of the wheel 10, it is preferable that the trace of the tips of the brush has a component in the direction of the width of the vehicle. In this respect, the road surface condition changing apparatus according to the present embodiment provides the component in the width direction of the vehicle. Thus, the road surface condition changing apparatus according to the present invention can efficiently sweep water away from an area where the wheel 10 moves so that hydroplaning is prevented.

A description will now be given of a road surface condition changing apparatus according to a fifth embodiment of the present invention. The road surface condition changing apparatus according to the present embodiment is achieved by replacing the cylinder member 12 shown in FIG. 1, 6 or 10 with a cylinder member having a water absorbing material wound thereon, and performing the control routines shown in FIGS. 5 and 11 by the ECU 34.

In the road surface changing apparatus according to the present embodiment, the water absorbing material is durable so that the water absorbing material is not damaged when the material is pressed against the road surface. When the vehicle provided with the road surface condition changing apparatus is moving in a rainy condition, conditions of steps 200 to 206 of FIG. 11 are established and thus the cylinder member having the water absorbing material is pressed against the road surface in front of the wheel 10. As a result, water in front of the wheel 10 is absorbed by the water absorbing material, preventing an occurrence of hydroplaning. The water absorbed by the water absorbing material is separated therefrom due to centrifugal force generated by the rotation of the cylinder member. Thus, the water absorbing material can maintain the water absorbing function.

When the vehicle provided with the road surface condition changing apparatus according to the present embodiment is moving on a frozen or icy road, and if the process of step 102 and 104 of FIG. 5 or the process of step 108 and 110 of FIG. 5 is established, the cylinder member is pressed against the road surface. In the present embodiment, the water absorbed by the water absorbing material is also frozen in such a condition where the road is frozen. The water frozen on the surface of the water absorbing material may produce protrusions projecting from the water absorbing material. These protrusions may function similarly to the protrusions 14 provided on the cylinder member 12 shown in FIG. 1. Thus, the cylinder member according to the present embodiment is capable of forming scratches or grooves shown in FIG. 4 when the road is frozen or icy.

The road surface condition changing apparatus according to the present invention can improve the road surface condition to prevent an occurrence of hydroplaning on a wet road surface as well as to increase a gripping force of the wheel 10 on a frozen or ice road surface. Thus, the road surface condition changing apparatus according to the present embodiment is useful to stabilize the movement of a vehicle under a wide range of circumstances.

In the above-mentioned first to fifth embodiments, although the cylinder member is provided in front of the drive wheel 10, the cylinder member may also be provided in front of an idler wheel.

The present invention is not limited to the specifically disclosed embodiments, and variations and modifications may be made without departing from the scope of the present invention.

What is claimed is:

1. A road surface condition changing apparatus for a vehicle, comprising:

a cylinder member provided in front of a wheel of said vehicle, said cylinder member being rotatable about a rotational axis corresponding to a longitudinal center of said cylinder member and adapted to be pressed against a road surface; and a support mechanism for supporting said cylinder member so that the rotational axis of said cylinder member is parallel to the road surface and is inclined with respect to the rotational axis of said wheel, said support mechanism including a wobbling mechanism for permitting a wobble action of said cylinder member, said wobbling mechanism including a bushing having an elastic member, said bushing connecting parts of said support mechanism, wherein said cylinder member includes a plurality of protrusions projecting from an outer surface of said cylinder member so as to change a road surface condition while being rotated.

2. The road surface condition changing apparatus as claimed in claim 1, wherein said support mechanism comprises a moving mechanism for moving said cylinder member between a first position and a second position above said first position with respect to a body of said vehicle, said cylinder member contacting the road surface at said first position, said cylinder member being spaced away from the road surface at said second position.

3. The road surface condition changing apparatus as claimed in claim 2, wherein said moving mechanism comprises a pressing mechanism for pressing said cylinder member against the road surface with a predetermined pressing force.

4. The road surface condition changing apparatus as claimed in claim 3, wherein said pressing mechanism comprises a hydraulic actuator.

5. The road surface condition changing apparatus as claimed in claim 2, wherein said moving mechanism includes:

determining means for determining whether a gripping force of said wheel is less than a predetermined gripping force; and control means for controlling a position of said cylinder member so that said cylinder member is moved to said first position when it is determined that the gripping force of said wheel is less than said predetermined gripping force.

6. The road surface condition changing apparatus as claimed in claim 5, further comprising an acceleration sensor detecting a rate of change in moving speed of said vehicle and a wheel speed sensor detecting rotational speed of said wheel, wherein a determination of said determining means is based on a difference between the rate of change in the moving speed of said vehicle and a rate of change in the rotational speed of said wheel.

7. The road surface condition changing apparatus as claimed in claim 6, further comprising a temperature sensor sensing an atmospheric temperature outside said vehicle, wherein a determination of said determining means is further based on a temperature sensed by said temperature sensor.

8. The road surface condition changing apparatus as claimed in claim 1, wherein said cylinder member is an elastic material which deforms to follow a shape of the road surface when said cylinder member is pressed against the road surface.

9. A road surface condition changing apparatus for a vehicle, comprising:

a cylinder member provided in front of a wheel of said vehicle, said cylinder member being rotatable about a rotational axis corresponding to a longitudinal center of said cylinder member and adapted to be pressed against a road surface; and a support mechanism for supporting said cylinder member so that the rotational axis of said cylinder member is parallel to the road surface and is inclined with respect to the rotational axis of said wheel, said support mechanism includes a wobbling mechanism comprising a bushing having an elastic member, said bushing connecting parts of said support mechanism, wherein said cylinder member includes brushes extending from an outer surface of said cylinder member.

10. A road surface condition changing apparatus for a vehicle, comprising:

a cylinder member provided in front of a wheel of said vehicle, said cylinder member being rotatable about a rotational axis corresponding to a longitudinal center of said cylinder member and adapted to be pressed against a road surface; and a support mechanism for supporting said cylinder member so that the rotational axis of said cylinder member is parallel to the road surface and is inclined with respect to the rotational axis of said wheel, wherein said cylinder member includes water absorbing material wound on an outer surface of said cylinder member.

* * * * *